R. D. KLINE.
METHOD OF FORCING PLANTS.
APPLICATION FILED FEB. 17, 1917.
1,260,914.
Patented Mar. 26, 1918.
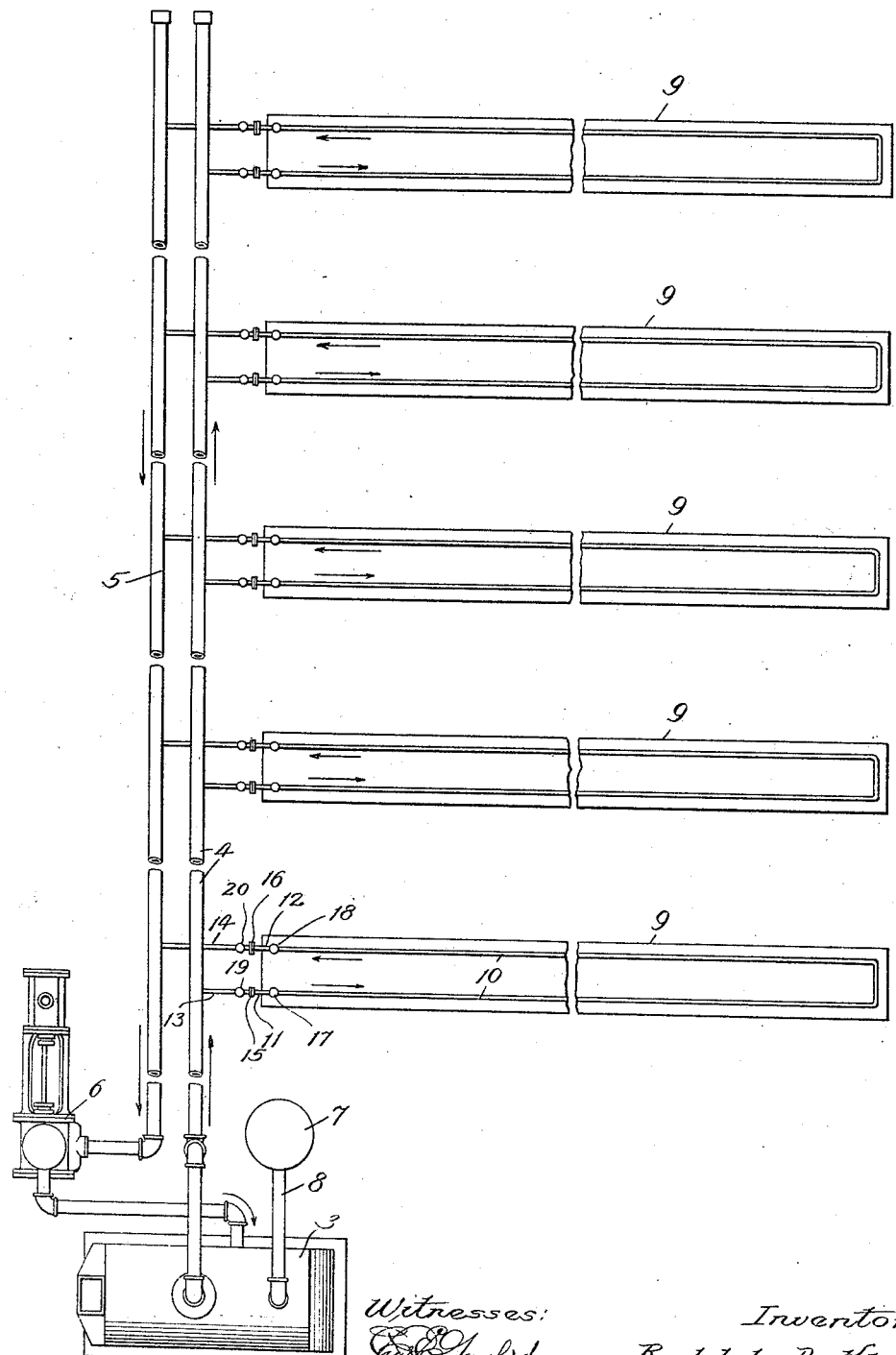
Witnesses:
Inventor:
Rudolph D. Kline,
By Dyrenforth, Lee, Chritton and Wiles
Attys.

UNITED STATES PATENT OFFICE.

RUDOLPH D. KLINE, OF STREATOR, ILLINOIS.

METHOD OF FORCING PLANTS.

1,260,914.     Specification of Letters Patent.     Patented Mar. 26, 1918.

Application filed February 17, 1917. Serial No. 149,172.

*To all whom it may concern:*

Be it known that I, RUDOLPH D. KLINE, a citizen of the United States, residing at Streator, in the county of La Salle and State of Illinois, have invented a new and useful Improvement in Methods of Forcing Plants, of which the following is a specification.

My invention relates, more particularly, to an improved method of forcing in the field, vegetable-plants, such as asparagus, and the like, for producing crops out of season, the invention being more particularly applicable to the forcing of plants which yield their crops at the commencement of the growing period.

The plants above referred to, and others of like character, by reason of their nature, under the weather conditions in the northern latitudes, mature, and become dormant, after the summer season has elapsed, and under natural conditions remain dormant until the spring months, during which dormant period no crops under natural conditions are obtainable.

It is common practice to force plants of the character above stated, intermediate the time they become dormant and the time they naturally begin to again grow, this forcing being accomplished by placing an inclosure over the plants to be forced and maintaining therein a relatively high degree of temperature, usually from 80° to 95° F. and while plants thus forced render moderately satisfactory yields, this practice presents relatively great disadvantages.

The forcing of plants of the character above stated, especially asparagus, when carried on on a commercial scale, involves the planting in the field of the seeds or plants, and the culture of the same for a number of years to produce healthy seasoned plants and when the plants are sufficiently developed, the placing of removable houses usually from 16 to 18 feet in width and of any desirable length, over the plants and the heating of the same, after the plants have matured, or become dormant, the houses after the forcing is completed and the crop has been harvested, being removed to another portion of the field to force other plants, the plants thus forced being allowed to grow naturally without further forcing, for the number of years requisite to restore the plants to a condition, wherein they will yield, when again forced, a sufficiently good crop to warrant the expense incident to forcing them. Thus not only is the grower of the plants interested, from the standpoint of the economical conducting of his business, in the extent of the crops which he harvests and the character of the harvested crops, but also in the conservation of his plants and their quick restoration to healthy vigorous condition, after a forcing period; this being especially true as to asparagus, as it requires a number of years of growth before it is sufficiently strong and vigorous to fit it for forcing.

Referring now to the disadvantages of forcing plants, especially asparagus, by subjecting them to relatively high temperature in accordance with prior practice, one of the greatest disadvantages is in the character of the crop harvested. The high temperature maintained in the houses heats the soil thereunder to substantially the heat in the houses and this heat, while causing the shoots to grow quickly, results in the shoots to be harvested, becoming drawn and spindling in their effort to mature, reducing the size, weight and quality of the crop, even if at the time the forcing begins the shoots are of fairly large diameter, this in a measure being due to the fact that in the rapid growth of the shoots under this high temperature, the shoots instead of receiving their nourishment from the ground surrounding the roots, which would result in causing the shoots to be of relatively large diameter, receive their nourishment, to a large degree, from the roots and body of the plant, which cannot in turn replenish the spent nourishment from the ground at the same rate as it is giving it out, and thus, in effect, the plant becomes starved or debilitated to a degree depending on the rapidity of growth of the shoots, and this in turn so weakens the plants that if they do not die, they require, for recuperation, sometimes many years of growth under natural conditions if they ever do recuperate.

Furthermore, the subjection of the plants to a high degree of heat for forcing, tenders them and if the forcing period ends during the winter and the house is removed to another location for forcing, as is usually the case when forcing is carried on under commercial conditions, the plants require relatively heavy protection from frost, such as may be obtained by using manure, which it is the practice to spread in a thick blanket over the tender plants. The plants being tender and highly susceptible to the cold, even the employment of the protective blanket under practical conditions is not effective to the maximum degree, and the plants usually suffer a set-back from which they recover, if at all, only after a relatively long time has elapsed.

The forcing of the plants under a relatively high heat presents another disadvantage which oftentimes proves very damaging, if not fatal to the plants. The existence and healthy growth of a plant is dependent on certain bacteria in the ground which flourish to the maximum degree when the ground is at a temperature much less than that above stated and at which forcing has hitherto been practised. The ground, however, also contains other bacteria of a character which war against the above referred to bacteria, viz., which are favorable, and necessary to plant growth. These unfavorable bacteria thrive and become aggressive though ordinarily innocuous, and increase very rapidly, as compared with the favorable bacteria, when the ground is at the temperature at which forcing is carried on under former practice, and thus these conditions militate against the most favorable growth of the plant and operate to supplement the rapid growth of the shoots, in producing the starving of the plant and its consequent loss of vitality, presenting another factor in retarding restoration of the plants to their natural vigor.

The spreading of manure or other protective covering over the plants after the forcing period, which involves relatively great expense, also is objectionable, as when applied thick enough to protect the plants is of such depth that it results especially in connection with the hard baked surface of the ground, to collect and hold the drifting snow which melted by the heat of the soil, forms a water-blanket which overlies the plants, preventing the circulation of air through the soil, and causing the ground to become sour, and smothering and killing the favorable bacteria in the ground, leaving the plants at least partially unprotected from the bacteria and other fungus growths unfavorable to the healthy growth of the plant, and which are caused to thrive and become dangerously parasitic to the plants at the relatively high temperatures stated, which in attacking the plants, weakens them and oftentimes kills them. Furthermore the manure harbors vermin which are not only destructive to the plants but carry and distribute unfavorable bacteria and other fungus growth.

The forcing of plants under high temperatures is also objectionable, inasmuch as the higher the temperature at which forcing takes place, the higher the proportion of temperature required to restore the plants to growing condition, after it has lapsed into dormant condition, should the temperature in the house over the plants drop by accident, or otherwise, to a point where the ground becomes chilled sufficiently to render the plants dormant.

It will also be understood that where the plants are forced to such an extent and under such conditions as above stated, they are greatly weakened, requiring growth under natural conditions for a relatively long period of time, or when killed, or so impaired that replanting is necessary, the item of acreage planted, relative to area forced each year, is of great moment, from the standpoint of cost of conducting a farm on a commercial scale.

The result generally stated of forcing plants in accordance with this prior practice, is that the crop is not only small and of relatively inferior character, but the plants are weakened oftentimes fatally, and usually to such an extent that if they do recuperate they lose practically fifty per cent. or more of their efficiency, these results having led those engaged in the raising of asparagus in particular, to seriously consider the advisability of replanting all fields after one forcing, and involving the maintaining of a relatively large acreage compared with the acres harvested each year.

My objects, generally stated, are to provide an improved method of forcing which shall be eminently suited to the forcing of plants on a commercial scale, and whereby the crop yield for any given area of plants will exceed that obtainable, by the methods previously employed, the character of the crop will be improved, and the plants by forcing will not be materially weakened as distinguished from the plants in the case of forcing in accordance with prior practices, whereby they may recuperate practically to normal condition, and be ready for another forcing period, with the desirable results, after a relatively short period of subjection to natural growing conditions.

My invention, broadly stated, consists in forcing the plants after they have matured following the natural growing season, by covering them with any suitable house or other inclosure such as is now commonly used and maintaining the air therein, by artificial means, at a temperature above freezing, and below about 55° F., preferably at a temperature from 35° to 45° F. The result of thus forcing the plants is to cause them to grow comparatively slowly, the plants thereby receiving their nourishment primarily from the ground through the roots and body of the plant and thereby growing under the most advantageous conditions, for producing a satisfactory crop. The shoots which spring up from the roots and which when they start to grow are thick and vigorous, maintain this characteristic during their slow growth, and do not hasten to mature and thereby become drawn out and spindling, as in the case of forcing under high temperature, and this result is particularly true as regards the forcing of asparagus, where it is desired that the shoots, forming the crop, be relatively thick. Furthermore, the maintaining of the relatively low temperature stated is not conducive to the propagation and vitalizing of the unfavorable bacteria or other fungus growth and therefore the plants grow and thrive under the most favorable conditions. Another important advantage in employing my method, is that the plants are not unduly weakened by the forcing process, and inasmuch as the temperature to which they are subjected is low, they do not become tendered to such a degree as renders necessary the use of the objectionable covering necessary to be placed over them when high temperature is used, as above stated, upon removing the house or inclosure, in the winter, after the forcing period is over, and thus the objections above pointed out are avoided. Also the volume of the crop harvested from a given number of plants is greater than the volume harvested from the same number of plants when high heat is used, as practically the same number of shoots are harvested and the thickness of each shoot is greater, and when the elements of the devitalizing of the plants and their ruin or their requirement for a relatively long period of rest before again forcing under the old practice, are considered, not only the yield per acre of plants, but also the yield per house, even when the condition that a house under my improved method is used at two locations only in a given season in a field, is considered, is greater than when high temperatures are employed under which latter condition a house may be used at three locations in a field during a forcing season. Another factor in the reducing of the expense of conducting a business of forcing plants out of season by using my improved method, is that of fuel consumption. Steam or hot water is usually employed to heat the houses, and whereas according to the old practice, where high heat is employed, the cost of fuel consumption is relatively great, by reason of the relatively low heat maintained in accordance with my method, the cost of fuel consumption is relatively small and furthermore by reason of the necessity for a heating plant of relatively small capacity only, the expense of installation is greatly reduced. Any suitable means may be employed for carrying out my improved method, a desirable form of means for this purpose being shown in the accompanying drawings in which the figure shown is a plan view in the nature of a diagram of a plurality of forcing-houses and a hot water system for supplying heat thereto.

As a preface to a description of the system of houses and heating means shown, it may be stated that in the forcing of plants, such as asparagus on a commercial scale, the fields are generally planted to cause the plants to extend in rows across the same and the houses to be used in forcing are moved from one group of rows of plants to another to reposition the houses after a forcing operation has been completed, and the arrangement illustrated is of such character that the forcing may be carried on as above stated.

In the particular arrangement illustrated in the accompanying drawing by a diagrammatic view a hot water boiler is represented at 3, and a pipe for conducting hot water to the houses is represented at 4, this pipe in practice being several hundred feet long under some conditions and stretching across the field preferably at substantially right angles to the rows of plants to be forced. The return pipe for the hot water is represented at 5, this pipe being preferably of substantially the same length as the pipe 4 and paralleling it across the field as indicated in the drawing. The return pipe 5 connects with the lower part of boiler 3 in accordance with the common practice of providing hot water heating installations. A pump represented at 6, and which may be of any suitable construction is interposed in the return pipe 5 closely adjacent to the point at which the latter communicates with the boiler 3. The pump 6 is provided for the purpose of insuring the proper circulation of the heating water through the various houses hereinafter referred to, though it will be readily understood that any other suitable means may be provided for this purpose, where, under the conditions some means are necessary or desirable to supplement the flow which naturally takes place by the heating of the water in the boiler. An expansion tank is represented at 7, this tank being connected with the boiler 3 as by the pipe 8, and serving the usual purpose.

A number of the forcing houses are represented at 9 and it may be here stated that I do not wish, by the arrangement shown in the drawing, to be understood as intending to limit my invention to any particular relation of the houses to each other, or to the heating system. The houses referred to may be of any suitable construction, but as houses of this kind have been used for a number of years and are well known in the art, description thereof would appear to be unnecessary. In the particular arrangement shown, each house is adapted to be connected with the pipes 4 and 5, to cause the heating medium to circulate therethrough for maintaining the ground covered by the houses at the desired temperature. Accordingly each house 9 contains the piping 10 which is coupled at its ends 11 and 12 with pipes 13 and 14, respectively, communicating with the pipes 4 and 5 respectively, the points at which the pipes are so coupled being represented at 15 and 16. The ends 11 and 12 of the pipes 10 contain valves 17 and 18 respectively and the adjacent ends of the pipes 13 and 14 contain valves 19 and 20 respectively, and this arrangement is carried on throughout the system, the pipes 4 and 5 being tapped at intervals as represented generally in the drawings to provide connections between these pipes and the various houses.

It will be readily understood from the foregoing that when the valves 17, 18, 19, and 20 controlling any one of the houses 9, are open, the heating water will circulate therethrough and thus heat the houses, and that by these valves the supplying of the heat medium to the houses may be controlled and regulated as desired. Furthermore the provision of the valves 17 and 18 serve to prevent the running of the water out of the piping 10, where hot water is used as the heating medium, in the event of the shifting of the houses to different locations.

In the operation of the heating system the heat medium is supplied to the houses as above stated in such volume as to cause the temperature of the air in the houses to be maintained at a temperature slightly above freezing, and below about 55° F. preferably from 35 to 45° F., until the period of forcing has elapsed. The houses may then be shifted to another location for forcing other plants, and in this connection attention may again be brought to the fact that inasmuch as the temperature to which the plants have been subjected is relatively low, the danger of damaging the plants by cold air, upon uncovering them, which occurs when the houses are moved to a new location, is practically negligible and renders necessary the use of very light covering only, if any, for the plants.

In the commercial exploitation of my improved method the houses, as above stated, would usually be provided with the idea of shifting them to a new location after the forcing operation at the places at which the houses were initially placed. Provision is made in the arrangement illustrated for carrying out this practice. When a house is to be moved the couplings 15 and 16 are separated and after the house has been positioned at the new location the ends 11 and 12 may be connected together through the means of relatively short lengths of pipe (not shown) which would be connected at the said couplings. It will be readily understood that my invention is not in any way dependent upon this or any other specific feature of the apparatus shown, and I do not therefore wish to be understood as intending to limit the invention in any way to the practising of the same in connection with the apparatus shown.

What I claim as new and desire to secure by Letters Patent is—

1. In the art of forcing asparagus in the field, the process of cultivating the embedded plants, inclosing the plants in the field after such cultivation and after the completion of their natural growing period, and thereafter causing them to grow during a period other than the natural growing period by subjecting them continuously throughout such forcing period to a temperature above freezing and below about 55° F.

2. In the art of forcing the growth of asparagus in the field, the process of cultivating the embedded plants, inclosing the plants in the field after such cultivation and after the completion of their natural growing period, and thereafter causing them to grow during a period other than their natural growing period by subjecting them continuously throughout such forcing period to a temperature above freezing and from 35° to 45° F.

3. In the art of forcing the growth of asparagus in the field, the process of cultivating the embedded plants, inclosing the plants in the field after such cultivation and after the completion of their natural growth, and thereafter causing them to grow during a period other than their natural growing period by subjecting them continuously throughout such forcing period to a temperature above freezing and below 55° F. by introducing heat into the inclosure for the plants and above the surface of the ground.

4. In the art of forcing the growth of asparagus in the field, the process of cultivating the embedded plants, inclosing the plants in the field after such cultivation and after the completion of their natural growing period, and thereafter causing them to grow during a period other than their natural growing period by subjecting them continuously throughout such forcing period to a temperature above freezing and from 35° to 45° F. by introducing heat into the inclosure for the plants and above the surface of the ground.

RUDOLPH D. KLINE.